United States Patent [19]

Ikeda

[11] 3,765,217

[45] Oct. 16, 1973

[54] METHOD FOR MOULDING PROTRUDED SHAFTS AS ONE BODY

[76] Inventor: Hidekatsu Ikeda, 40, 1-chome Choliji Higashi, Osaka-shi, Japan

[22] Filed: Sept. 14, 1971

[21] Appl. No.: 180,266

[30] Foreign Application Priority Data
Mar. 24, 1971 Japan ..........................46/18170

[52] U.S. Cl. ........................ 72/334, 72/345, 72/379
[51] Int. Cl. ............................................ B21d 31/06
[58] Field of Search ...................... 72/130, 137, 253, 72/263, 265, 266, 273, 167, 256, 267, 348, 352, 356, 361–363, 373–375, 377, 379, 343–346, 324–334, 335, 339; 29/34 R, 564, 180 S, 180 SS, DIG. 15, DIG. 37

[56] References Cited
UNITED STATES PATENTS
2,966,987  1/1961  Kaul ..................................... 72/256
3,410,127  11/1968  Burns ................................... 72/256

Primary Examiner—Richard J. Herbst
Assistant Examiner—Joseph A. Wolkowski
Attorney—E. F. Wenderoth et al.

[57] ABSTRACT

A method for moulding a base plate with an integral shaft. The method is carried out by successively performing, during the period and intermittently travelling plate of material is stationary, the steps of forming holes at required distances from each other, forming enlarged projections on the under face of the plate for insertion into successive concave holes by pressing on the upper face of the plate for making the plate material thinner between the holes, and finally press-inserting the enlarged projections into successively smaller diameter concave holes to thus reduce the diameter of the projections.

1 Claim, 4 Drawing Figures

PATENTED OCT 16 1973   3,765,217
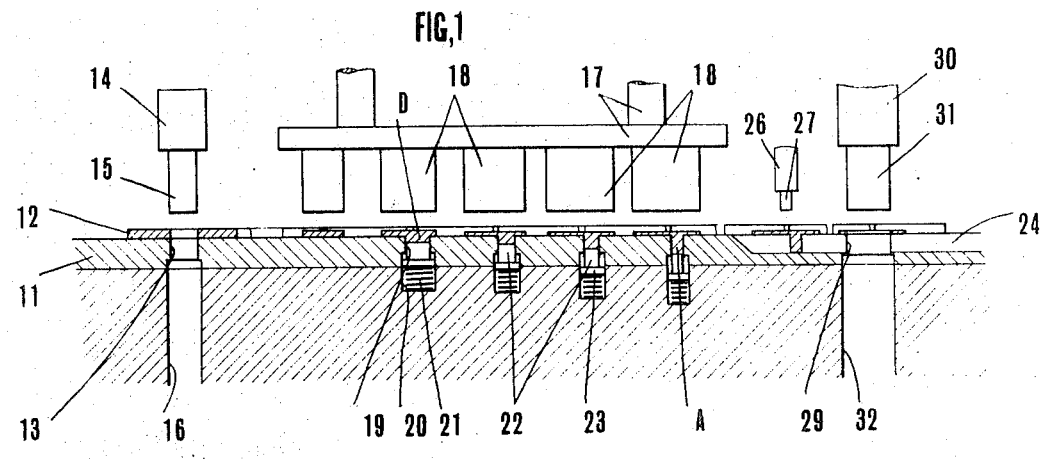
FIG.1
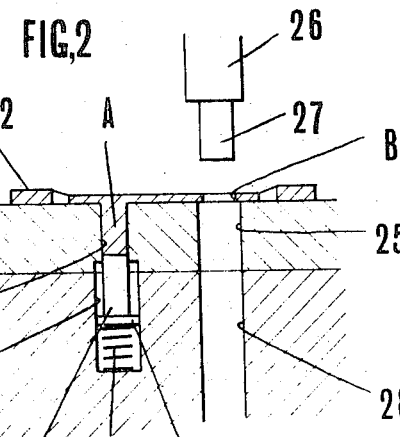
FIG.2
FIG.3
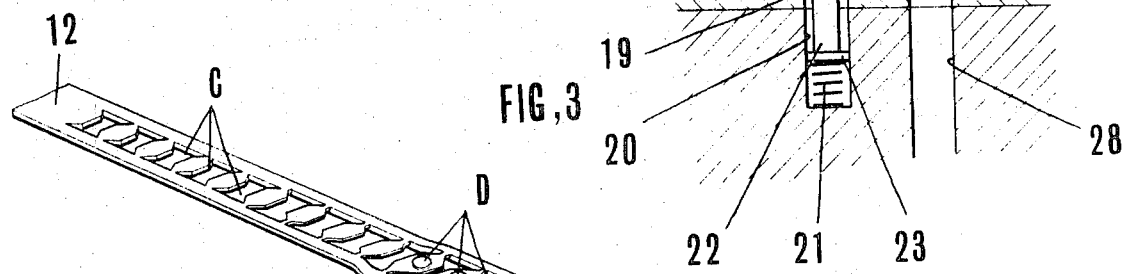
FIG.4
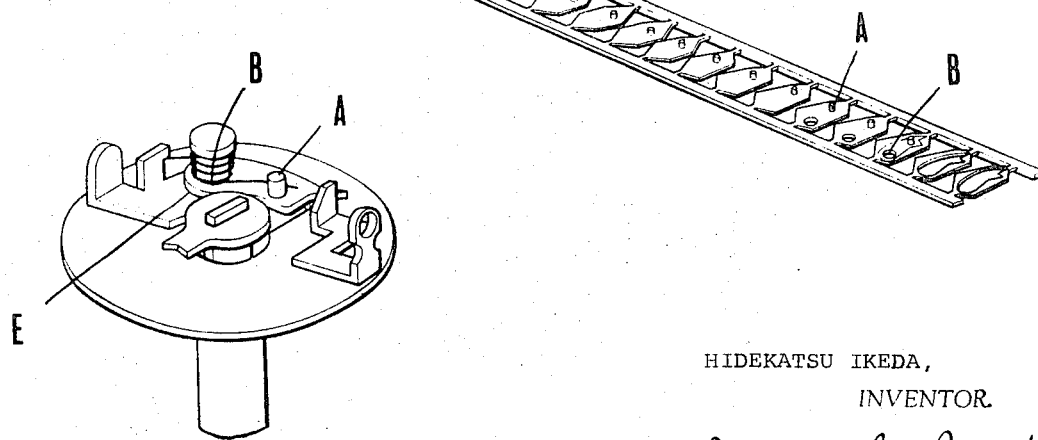
HIDEKATSU IKEDA,
INVENTOR.
BY Wenderoth, Lind & Ponack
ATTORNEYS

METHOD FOR MOULDING PROTRUDED SHAFTS AS ONE BODY

The invention relates to a method of moulding protruded shafts united with a base plate in a body.

Conventionally, in fixing the protruded shafts in the base plate, the base plate was drilled, the shaft material such as a rivet or a pin being inserted, calked and arranged. However, this method had such disadvantages as the requirement of at least two parts in arranging, the higher price because of many processes to pass through, and the poor durability caused by frangible calking portions.

It is an object of this invention to provide a device wherein expanded projections are provided on a material plate by means of a press through intrmittent delivery of a bandlike material plate, the protruded shafts of some extended length being moulded and integrated by gradually reducing, in diameter, the expanded projections.

The above object is accomplished by each portion composing the present invention, and the combination thereof. The embodied example will be illustrated by the accompanying drawings and the detailed explanation described in the following:

FIG. 1 is a longitudinal section side view of moulding means;

FIG. 2 is a longitudinal section front view showing a drilled portion thereof;

FIG. 3 is a slant face view of a material plate worked thereon;

FIG. 4 is a slant view showing the usage of a product made thereon.

In FIGS. 1 and 2, a table 11 is horizontal in the upper surface thereof, which table is designed to intermittently deliver, in a fixed pitch, a piece of permanently variable bandlike material plate 12 such as copper or brass towards the upper surface front end of the table 11 from the opposite end thereof. A female die 13 is provided in the upper surface back end portion of the table 11 in response to the under face of said material plate 12, immediately above which female die 13 being arranged an elevating unit 14 going up and down intermittently from the intermittent delivery stop of the material plate 12 to the start thereof, a male die 15 being vertically arranged in the under face of the elevating unit 14 in order to insert into the female die 13 for punching a through hole between both end sides of said material plate 12 by the under edge thereof upon descending of the elevating unit 14. A fall passage 16 is directed to the under face of the table 11 from the bottom of the female die 13, an elevating unit 17 being positioned right above the central portion of the table 11 for intermittently ascending and descending between the intermittent delivery stop of the material plate 12 and the start thereof.

Also, a hammer 18 is adapted to press said material plate portion 12 with no holes, thinner between the front and back ends of the elevating unit 17 lower face as the distance is farther towards the front end thereof, said hammer being vertically arranged so that the distance between the centers of each hammer 18 may be equal to the intermittent delivery pitch of the material plate 12. moulding concave holes 19 are formed, on the table 11, smaller in diameter and deeper, as the distance is farther towards the front end thereof, to answer to the hammers 18 except the rear one, the front one being formed to finally become a mould for the protruded shaft A. Recesses 20 respectively are connected to each bottom of the moulding concave holes 19 and are formed downwards larger, in diameter, than each said moulding concave hole 19, respective shaft material 22 provided with lifting restitution force by means of a spring 21 fixed in the recess being inserted into each moulding concave hole 19, the upper end of the respective shaft material 22 being adapted to be level with the upper surface of the table 11 as the lower end flange 23 of the shaft material 22 contacts the upper end of the recess 20 to thus check the lifting power. A concave channel 24 is arranged wherein the tip is located in front of the front end hammer 18 on the upper surface of the table 11, the protruded shaft A being engaged and past therethrough.

Also, a female die 25 is provided in the table 11 for punching, in a portion with the concave channel 24, a hole B in the material plate 12, above which female die 25 being vertically provided with an elevating unit 26 to go up and down while the material plate 12 stops, a male die 27 being fixed to the under face of the elevating unit 26 for inserting the lower end thereof into the female die 25. The fall passage 28 is provided downwards from the bottom of the female die 25. A female die 29 is positioned, in front of the female die 25, in the table 11 for punching a portion with the protruded shaft A in the material plate 12, right above which female die 29 being vertically provided with an elevating unit 30 to go up and down while the material plate 12 stops, a male die 31 being fixed to the under face of the elevating unit 30 for inserting the lower end thereof into the female die 29. A passage 32 is coupled with the bottom of the female die 29 for falling and discharging the punched products downwards.

In a method for moulding the protruding shafts integrate with the base plate of the present invention as described above, the material plate 12 is intermittently delivered on the table 11 from the rear end of the table 11 to the front end thereof, the under edge male die 15 of the descending elevating unit 14 over the rear end of the table 11, being inserted into the female die 13, between the intermittent delivery stop of the material plate 12 and the start thereof, to thus punch a through hole C in said material plate 12, whereby the punched portion is discharged from the passage 16 connected to the bottom of the female die 13, the elevating unit 14 being lifted so that the male die 15 may break away from the female die 13, said material plate 12 being intermittently delivered by the time when the elevating unit 14 finishes its descent so that the material plate portion with no holes C may be gradually positioned right under the rear hammer 18.

The material plate 12 right under the rear hammer 18 is pressed thinner by means of the hammers 18 of the elevating unit 17 performing the descent and following ascent restitution by the time said material plate 12 is intermittently delivered to next delivery.

As the portion pressed by the rear hammer 18 of the material plate 12 comes right under the next foreward hammer 18, the portion located on the moulding concave hole 19 for the material plate 12 to be pressed by the descending hammer 18 turns into an expanded projection D by pressing down the shaft material 22 into said moulding concave hole 19. As the hammer 18 is broken away from the material plate 12 by the ascent of the elevating unit 17, the increased upper surface pressure of said material plate 12 is released, whereby the expanded projection D fitted in the moulding concave hole 19 is broken away by the shaft material 22 rising through the force of the spring 21, thereafter the material plate 12 being intermittently delivered.

The expanded projection D, advancing to the next moulding concave hole 19 by the intermittent delivery of said material plate 12, is pressure-inserted into said moulding concave hole 19 to thus reduce the diameter, the protruded shaft A being moulded by the concave hole 19 of the front end through the repetition of the same procedure at the forward moulding concave holes 19 successively.

The protruded shaft A to break away from the concave hole 19 of the front end travels engaged into the concave channel 24 by the intermittent delivery of the material plate 12. The elevating unit 26 descends upon the material plate 12 portion with the protruded shaft A, whereby the male die 27 is inserted into the female die 25 to thus punch a hole B, the portion with the hole B and the protruded shaft A being punched in front by the male die 31 to engage with the female die 29 through the descent of the elevating unit 30, whereby the punched product E falls through the passage 32, the product E being used as a volume switching piece as illustrated in FIG. 4.

The moulding of the protruded shafts as one body as mentioned above eliminates the following conventional disadvantages, such as that much more labor than necessary is required to put separate parts together; and that the provided portions are not tough, so durability is poor. This method is suitable for mass production, whereby the prices of the products are lowered.

What is claimed is:

1. A method of forming a plate having a shaft integral therewith and projecting therefrom, comprising the steps of intermittently feeding a strip of material, punching a piece of material from the strip at a first station along the path of feed of the strip each time the strip is stopped during the intermittent feeding for leaving between the spaces left by the punched out pieces shaped areas of the strip joined by edge portions along the length of the strip, pressing a shaped area of the strip at a second station along the path of feed each time the strip is stopped during the intermittent feeding for reducing the thickness thereof, pressing a shaped area of the strip at a third station along the path of feed each time the strip is stopped during the intermittent feeding against a female die having a generally cylindrical shape considerably larger than the size of the shaft to be formed, pressing a shaped area of the strip at a plurality of succeeding stations along the path of feed each time the strip is stopped during the intermittent feeding against generally cylindrically shaped female dies which are successively smaller than said firstmentioned die, the die at the last of said plurality of succeeding stations being the size of the shaft to be formed, lifting the strip between each of said stations a distance at least slightly greater than the length of the shaft formed at the said last of the said plurality of succeeding stations prior to moving it forwardly for removing the shaft portions from the dies, passing said shafts on said shaped areas of the strip into a groove beneath the strip beyond the said last of said plurality of succeeding stations in the direction of movement of the strip, and punching a shaped area of the strip out of the strip at a final station along the path of the feed each time the strip is stopped during the intermittent feeding, whereby there is continuously produced a succession of plates having shafts integrally formed therewith.

* * * * *